United States Patent
Tsuda et al.

(10) Patent No.: US 7,551,389 B2
(45) Date of Patent: Jun. 23, 2009

(54) DISK DRIVE AND METHOD OF RETRACTING HEAD THEREOF

(75) Inventors: Shingo Tsuda, Kanagawa (JP); Kenji Kuroki, Kanagawa (JP); Toshiroh Unoki, Kanagawa (JP); Minoru Hashimoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/975,516

(22) Filed: Oct. 18, 2007

(65) Prior Publication Data

US 2008/0137227 A1 Jun. 12, 2008

(30) Foreign Application Priority Data

Oct. 23, 2006 (JP) ............................. 2006-287304

(51) Int. Cl.
*G11B 21/02* (2006.01)
(52) U.S. Cl. ....................................................... 360/75
(58) Field of Classification Search ................. 360/75, 360/78.06, 77.02, 78.04, 78.01
See application file for complete search history.

(56) References Cited

U.S. PATENT DOCUMENTS

| | | | | |
|---|---|---|---|---|
| 5,227,929 A | * | 7/1993 | Comerford | .................... 360/75 |
| 7,088,544 B2 | | 8/2006 | Jeong et al. | |
| 7,420,761 B2 | * | 9/2008 | Aoki et al. | .................... 360/75 |
| 7,428,119 B2 | * | 9/2008 | Kuroki et al. | .................. 360/75 |
| 2002/0093753 A1 | | 7/2002 | Atsumi | |
| 2004/0125490 A1 | * | 7/2004 | Fujiki et al. | .................... 360/75 |
| 2007/0159710 A1 | * | 7/2007 | Lucas et al. | .................... 360/75 |
| 2008/0030891 A1 | * | 2/2008 | Kim et al. | ................. 360/78.06 |

FOREIGN PATENT DOCUMENTS

JP 2005-235382 A 9/2005

* cited by examiner

*Primary Examiner*—Fred Tzeng
(74) *Attorney, Agent, or Firm*—Townsend and Townsend and Crew LLP; John Henkhaus

(57) ABSTRACT

Embodiments of the present invention relate to retracting a magnetic head of a disk drive device to a retract position in accordance with a fall state, and to suppressing the performance degradation due to erroneous fall determinations as well as occurrence of damage by a head-disk crash. According to one embodiment of the present invention, in a Hard Disk Drive (HDD), a servo controller moves a head slider to a cylinder at the side of a ramp at a predetermined timing that a fall determiner determines that it is falling and an unload controller starts an unload process. This shortens the time between determination by the fall determiner that it is falling to retraction of the head slider to the retract position. Furthermore, it prevents increase of the erroneous determinations by relaxing the fall determination condition for safety. Also, it shortens the time that the head slider returns to the initial position before the seek in case that it is not determined that it is falling.

13 Claims, 5 Drawing Sheets

DISK DRIVE AND METHOD OF RETRACTING HEAD THEREOF

CROSS-REFERENCE TO RELATED APPLICATION

The instant nonprovisional patent application claims priority to Japanese Patent Application No. 2006-287304 filed Oct. 23, 2006 and which is incorporated by reference in its entirety herein for all purposes.

BACKGROUND OF THE INVENTION

For a portable electronic device equipped with a hard disk drive (HDD), it is important that the electronic device is protected from a shock in the event it falls onto the ground. The HDD writes and reads data to and from a magnetic disk with a head slider flying over the rotating magnetic disk. Therefore, when a shock occurs due to the falling of the HDD in operation, the head slider crashes against the magnetic disk so that the magnetic disk or a head element portion on the head slider might be damaged.

As a protection mechanism to prevent such a damage of the HDD, a mechanism that detects the HDD or the electronic device equipped with the HDD being in a falling state and retracts the head slider to a retract position has been known in the art. For example, Japanese Patent Publication No. 2005-235382 ("Patent Document 1") discloses a technique which detects the shock amount applied to the HDD and retracts the head slider if the shock amount exceeds the critical value. Patent Document 1 also discloses a technique that changes the retract position of the head slider to the inner peripheral side or the outer peripheral side according to the position of the head slider.

Specifically, in Patent Document 1, the HDD detects the applied shock amount and determines whether the detected shock amount exceeds the critical value or not. Then, if the detected shock amount exceeds the critical value, it reads the positional information of the cylinder at which the head element portion on the head slider is located, and stops the command in execution. The HDD determines whether the read cylinder number exceeds a reference cylinder number or not, and moves the head slider toward the innermost peripheral direction of the disk if the read cylinder number exceeds the reference cylinder number, or otherwise moves the head slider toward the outermost peripheral direction of the disk.

In order to protect the magnetic disk or the head element portion from a shock by a fall, it is preferable to retract the head slider quickly to the retract position before the shock arises. Therefore, it is important to shorten the time to retract the head slider to the retract position upon the determination of the fall.

The technique of the above Patent Document 1 attempts to shorten the retract time by changing the retract position according to the current position of the head slider. However, the technique of the above Patent Document 1 starts retracting after the HDD receives the shock so that the retracting may not be in time. Besides, there is a limit to shorten the retract time because the retract time depends on the initial position of the head slider. Moreover, the retract positions are needed to be formed at the both of the outer and inner peripheral ends of the magnetic disk, which results in reducing the storage capacity of the disk.

In order to give a priority in protecting the magnetic disk and the head element portion from the shock by the fall, it can be considered that the determination reference for the fall is relaxed. However, if the fall determination reference is relaxed too much, a problem is caused that erroneous determinations of falls frequently occur although actual falls do not occur. Because the head slider cannot access the magnetic disk while the head slider is positioned at the retract position and much time is required for the head slider to move from the retract position to the initial position, the performance of the HDD goes down very much if the erroneous determinations increase. This is particularly apparent in HDDs with a load/unload scheme. Therefore, it is required to reduce the erroneous determinations of falls in the HDDs.

BRIEF SUMMARY OF THE INVENTION

Embodiments of the present invention relate to retracting a magnetic head of a disk drive device to a retract position in accordance with a fall state, and to suppressing the performance degradation due to erroneous fall determinations as well as the occurrence of damage by a head-disk crash. According to the particular embodiment of FIG. 3, in an HDD 1, the servo controller 221 moves the head slider 12 to a cylinder at the side of a ramp 15 at a predetermined timing that a fall determiner 223 determines that it is falling and an unload controller 222 starts an unload process. This shortens the time between determination by the fall determiner 223 that it is falling to retraction of the head slider 12 to the retract position. Furthermore, it prevents increase of the erroneous determinations by relaxing the fall determination condition for safety. Also, it shortens the time that the head slider 12 returns to the initial position before the seek in case that it is not determined that it is falling.

DETAILED DESCRIPTION OF THE INVENTION

Figure 1:
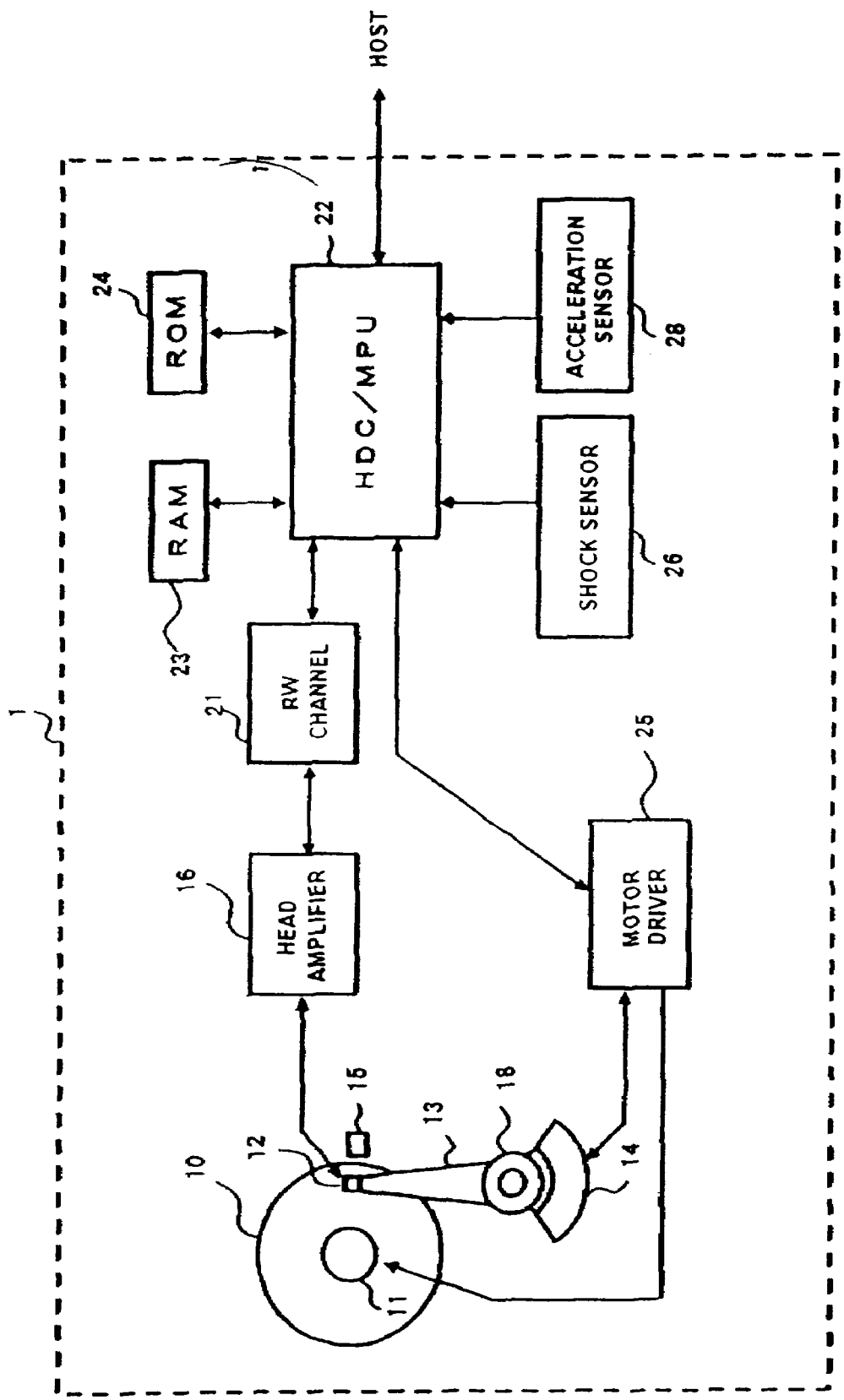
FIG. 1 is an exemplary block diagram schematically showing the configuration of the entire HDD according to one embodiment.

Embodiments of the present invention relate to a disk drive and a method of retracting a head thereof, in particular, to retracting the head according to a state of falling of the disk drive.

A disk drive according to an embodiment of the present invention includes a head for accessing a data region of a disk, a moving mechanism for supporting and moving the head, and a controller. The controller controls the moving mechanism to move the head to a retract position outside of the data region in response to that a detection result of a detector for detecting an acceleration reaches a first reference. The controller further controls the moving mechanism to carry out a seek operation of the head toward a radial position as a target which is closer to the retract position than a current position of the head in response to that a detection result of the detector reaches a second reference prior to reaching the first reference. Moving the head preliminarily to near the retract position by the seek may shorten the time to move the head to the retract position after reaching the first reference.

In a preferred example, the controller changes the second reference according to the position of the head at the time of starting the seek. This suppresses the performance degradation due to the seek before the retract.

In a preferred example, the controller changes the first reference and the second reference according to a command from an external. Or, the controller changes the first reference according to a command from an external and further changes the second reference according to the first reference. This achieves the control depending on use conditions by a user. If the detection result does not reach the first reference, the head returns to the process before the seek without moving to the retract position. This shortens the recovery process time very much.

In a preferred example, the controller starts to move the head to the retract position before the detection result of the detector exceeds the first reference when an error occurs in the seek. This prevents an occurrence of a damage due to a head-disk crash by a delay of the retraction by responding to the seek error. For example, the controller ceases an error recovery procedure and starts to move the head to the retract position when the detection result of the detector reaches the first reference on the way of the error recovery procedure for the error. This suppresses the delay of retract time. Or, the controller starts to move the head to the retract position in response to the occurrence of the error. This prevents the delay in retracting more accurately.

Another embodiment of the present invention is a method for retracting a head in a disk drive. This method obtains a detection result of a detector for detecting an acceleration and determines that the disk drive is falling in response to that the detection result reaches a first reference. Then, it moves the head to a retract position outside a data region of a disk in response to the determination that the disk drive is falling. And this method further conducts a seek of the head toward a radial position as a target which is closer to the retract position than a current position of the head in response to that the detection result of the detector reaches a second reference prior to reaching the first reference. Preliminary moving of the head near the retract position by the seek before the head is retracted to the retract position may shorten the time to move the head to the retract position after the detection result reaches the first reference. In the above method, the head does not move to the retract position but the process returns to the one before the seek if the detection result does not reach the first reference. Thus, the recovery process time is much shortened.

It may be preferable that the moving of the head to the retract position is started before the detection result exceeds the first reference if an error occurs in the seek. For example, an error recovery procedure for the error is ceased and the moving of the head to the retract position is started if the detection result of the detector reaches the first reference on the way of the error recovery procedure for the error. Or, the moving of the head to the retract position is started in response to the occurrence of the error.

In the disk drive retracting the head to the retract position according to the state of fall, embodiments of the present invention suppress the performance degradation of the disk drive due to the erroneous fall determination as well as an occurrence of a damage by a crash of the head against the disk.

Hereinafter, a preferred embodiment of the present invention is described in detail with referring to the drawings. Throughout the drawings, the same components are denoted by like reference numerals, and their repetitive description is omitted if not necessary for the sake of simplicity. The preferred embodiment described hereinbelow is an embodiment in which the present invention is applied to a hard disk drive (HDD) as an example of disk drive devices.

The HDD according to the present embodiment has a feature in the retracting process of the head slider according to the fall determination. The HDD of the present embodiment retracts the head slider to the retract position if the HDD determines that it is falling. Moreover, at a predetermined timing before the determination that it is falling, the head slider performs a seek to a target cylinder at the retract position side and prepares the retraction. This enables that the head slider quickly retracts to the retract position upon the determination that it is falling. If it is not determined that it is falling, the head slider may return to the initial position more quickly than from the retract position, which results in improvement of the performance.

To facilitate the understanding of a feature of the HDD of the present embodiment, the entire configuration of the HDD of the present embodiment is first outlined. In FIG. 1, the HDD 1 includes a magnetic disk 10 which is an example of data recording disks. The magnetic disk 10 is a non-volatile memory to record data by magnetizing a magnetic layer. The magnetic disk 10 is fixed to a hub of a spindle motor (SPM) 11. The SPM 11 rotates the magnetic disk 10 at a predetermined angular rate.

A head slider 12, an example of heads, includes a slider flying over the magnetic disk 10 and a head element portion formed on the slider. The head element portion includes a recording element which converts an electric signal to a magnetic field according to recording data to the magnetic disk and/or a reproducing element which converts a magnetic field from the magnetic disk 10 to an electric signal. The head slider 12 is supported at the tip end portion of a carriage 13. In particular, the carriage 13 contains a suspension (not shown) extending toward the tip end and the suspension supports the head slider 12.

The carriage 13 is fixed to a voice coil motor (VCM) 14. The assembly of the VCM 14 and the carriage 13 is an example of head moving mechanisms. The carriage 13 pivots around a pivotal axis 18 by driving force of the VCM 14 to move the head slider 12 in the radial direction over the magnetic disk 10 to above any target cylinder of the magnetic disk 10.

The HDD 1 of the present embodiment adopts a ramp-load scheme. Accordingly, the carriage 13 retracts the head slider 12 from above the recording surface of the magnetic disk 10 to the ramp 15 in the case of stopping the rotation of the magnetic disk 10 to transit to a non-operating state. The retracted head slider 12 rides onto the ramp 15 which is placed near the outer peripheral end of the magnetic disk 10 to park. This parking position is a retract position of the head slider 12.

Specifically, a tab (not shown) formed at the tip end of the suspension which constructs a part of the carriage 13 and supports the head slider 12 parks in a state that it has ridden on a parking area of the ramp 15. Hereinafter, the operation which retracts the head slider 12 from the magnetic disk 10 to the ramp 15 is referred to as unloading and the operation which moves the head slider 12 from the ramp 15 to above the magnetic disk 10 as loading.

The head amplifier 16 contains a read amplifier which amplifies a reproduction signal read from the magnetic disk 10 by the head element portion on the head slider 12 to output the amplified signal to a read/write channel (RW channel) 21, which is described later, and a write driver which amplifies the write signal input from RW channel 12 to record to the magnetic disk 10. The RW channel 21 modulates and converts the write data to the magnetic disk 10, and sends out the write signal to the head amplifier 16. Besides, the RW channel 21 demodulates the reproduction signal read out from the magnetic disk 10 by the head slider 12, and outputs the demodulated data to an HDC/MPU 22.

The HDC/MPU 22 is a controller for controlling the entire HDD 1 and includes a hard disk controller (HDC) which is a logical circuit and an MPU which operates according to a firmware. The HDC/MPU 22 performs control of positioning of the head slider 12, control of reading and writing data to and from the RW channel 21, control of interfacing an outer host, and defects managements, etc., with the HDC coordinating the MPU.

Specifically, the HDC/MPU 22 of the present embodiment determines whether or not the HDD 1 is in a state of falling (free-falling) by obtaining output of an acceleration sensor 28. When it determines that the HDD 1 is falling, it carries out the unloading the head slider 12 according to the determination. Then, the HDC/MPU 22 makes the head slider 12 move to a cylinder at the side of the ramp 15 at a predetermined timing before the head slider 12 is unloaded to the ramp 15. In addition, after getting in the state of non-fall, the HDC/MPU 22 determines the timing for allowing the head slider 12, which is unloaded according to the result of detection of being in a falling state by a shock sensor 26, to be reloaded. Details of these processes will be described later.

The RAM 23 is used as a work region for the HDC/MPU 22 to process operations as well as a data buffer. The ROM 24 is a non-volatile memory which stores a firmware program, etc. for realizing control according to embodiments of the present invention. The motor driver 25 drives the SPM 11 and the VCM 14 according to the control signal from the HDC/MPU 22.

The shock sensor 26 is a sensor for detecting a mechanical impact added to the HDD 1 due to a fall onto the ground and the like. The shock sensor 26 detects the change of the acceleration and outputs a voltage signal proportional to the acceleration. The HDC/MPU 22 extracts a frequency range corresponding to the impact from the signal outputted from the shock sensor 26 and determines whether or not any impact with more than the predetermined volume is applied to.

Figure 2:
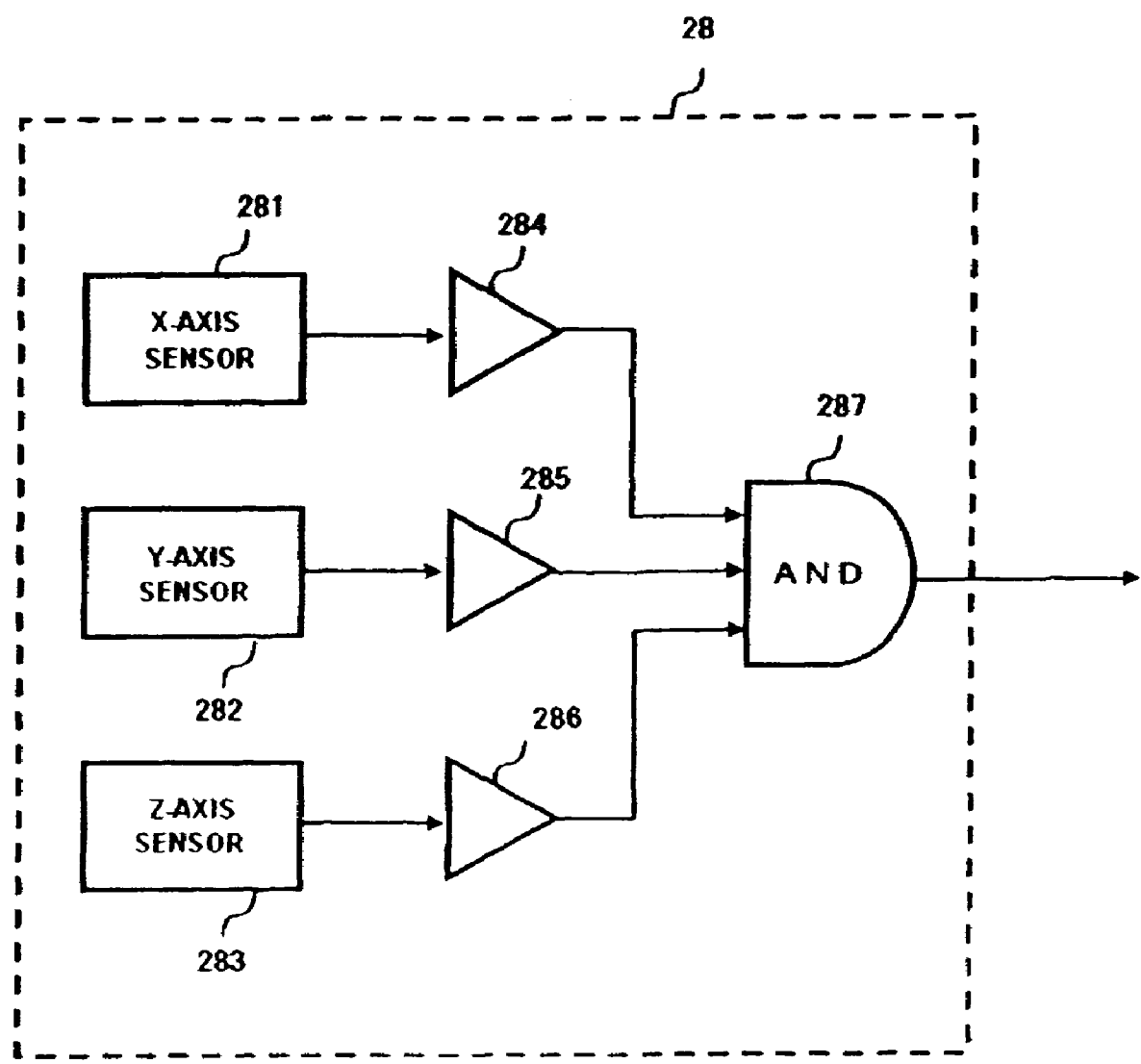
FIG. 2 is an exemplary diagram schematically showing the configuration example of the acceleration sensor mounted on the HDD according to one embodiment.

The acceleration sensor 28 is a sensor which may detect changes of the magnitude and the direction of the acceleration. A specific example of the configuration of the acceleration sensor 28 is illustrated in FIG. 2. The acceleration sensor 28 of FIG. 2 detects three directions of accelerations. It compares the absolute values of the detected three-directional accelerations to the predetermined thresholds and outputs a fall detection signal when all of the detected values of the three-directional accelerations exceed the thresholds. For example, the voltage values corresponding to any values from 0.2 G to 0.5 G are set as the thresholds and if the respective accelerations in the three directions are not more than the thresholds, it outputs a fall detection signal.

That is, the acceleration sensor 28 detects the falling state, i.e., the gravity-free state. Therefore, the acceleration sensor 28 is sometimes called a gravity-free sensor or a 0 G sensor. Here, 1 G corresponds to the acceleration of gravity (approximately 9.8 m/s$^2$). The thresholds are preferably a finite value selected from 0.2 G to 0.5 G as described above considering the centrifugal force accompanied by rolling during the fall and the zero-G offset of the sensor, rather than strict thresholds corresponding to zero-G.

As shown in FIG. 2, the acceleration sensor 28 contains an X-axis sensor 281, a Y-axis sensor 282, and a Z-axis sensor 283, which detect magnitudes of the accelerations in the three axes orthogonal to each other (herein referred to as the X-axis, the Y-axis, and the Z-axis). The X-axis sensor 281 outputs a voltage proportional to the detected acceleration to a comparator 284. Similarly, the Y-axis sensor 282 and the Z-axis sensor 283 output voltages proportional to the detected accelerations to the comparators 285 and 286, respectively.

For example, the comparators 284 to 286 compare the output voltages of the X-axis sensor 281, the Y-axis sensor 282, and the Z-axis sensor 283 with the threshold voltages corresponding to 0.4 G of the acceleration, and then outputs "High" in the case that the output voltages of the sensors are not more than the threshold voltages, which is the accelerations are not more than 0.4 G (corresponding to the gravity-free state), and outputs "Low" in the case that the accelerations are more than 0.4 G. An AND circuit 287 performs a logical product operation with respect to the outputs of the comparators 284 to 286 to output.

Hereafter, the relationship between the state that the HDD 1 is placed in and the acceleration detected by the acceleration sensor 28 is described. Although many types of acceleration sensors are manufactured, an acceleration sensor manufactured by the micro electro mechanical system (MEMS) technique is described as an example. This type of acceleration sensor includes a supporting part, a weight movable with respect to the supporting part, and a substrate containing a beam connecting the supporting part and the weight, and a piezo-electric element is provided on the beam on which stresses are concentrated when the weight is displaced with respect to the supporting part. The output of the acceleration sensor having such a configuration denotes the relative acceleration of the weight with respect to the supporting part.

In the case that the acceleration sensor 28 is the one manufactured by the above-described MEMS technique, the accelerations detected by the X-axis sensor 281 and the Y-axis sensor 282 are 0 G and the acceleration detected by the Z-axis 283 is 1 G in a state that the HDD 1 is standing still on a table parallel to an XY plate including the X-axis and the Y-axis of the acceleration sensor 28. For the sake of simplification of the description, ideal conditions are assumed such that detection errors like the 0 G offset, etc. are omitted.

When the HDD-1 is falling, all of the accelerations detected by the X-axis sensor 281, the Y-axis sensor 282, and the Z-axis sensor 283 are 0 G. Since a constant gravity acceleration is applied to the above-described supporting part and the weight, the relative accelerations between them are 0 G with respect to all of the three axes. Therefore, the AND circuit 287, for example, may detect the falling state (the gravity-free state) by all of the absolute values of the accelerations of the three axes being less than a predetermined threshold (0.4 G, for example) to output a fall detection signal as a binary signal which denotes the detection of a fall as "High" level and the non-detection of a fall as "Low" level.

The configuration of the acceleration sensor 28 illustrated in FIG. 2 is an example. To detect a fall, it is sufficient to detect a change of the static acceleration. For example, a sensor and the like which detects a gravity-free state by a mechanical switch which is released in the case of a gravity-free state may be adopted. Also, instead of using a logical circuit such as the comparator and the AND circuit like the above, the root-sum-square value of the outputs of the three-directional acceleration sensors may be calculated to output the fall detection signal if the calculation result is approximately zero. This calculation and the determination may be carried out by the HDC/MPU 22. Also, the shock sensor 26 and the acceleration sensor 28 may constitute a unit of acceleration sensor. In that case, the change of the acceleration caused by an impact and the change of the acceleration caused by a fall may be separated by the difference of the frequency band so that they may be detected independently.

Figure 3:
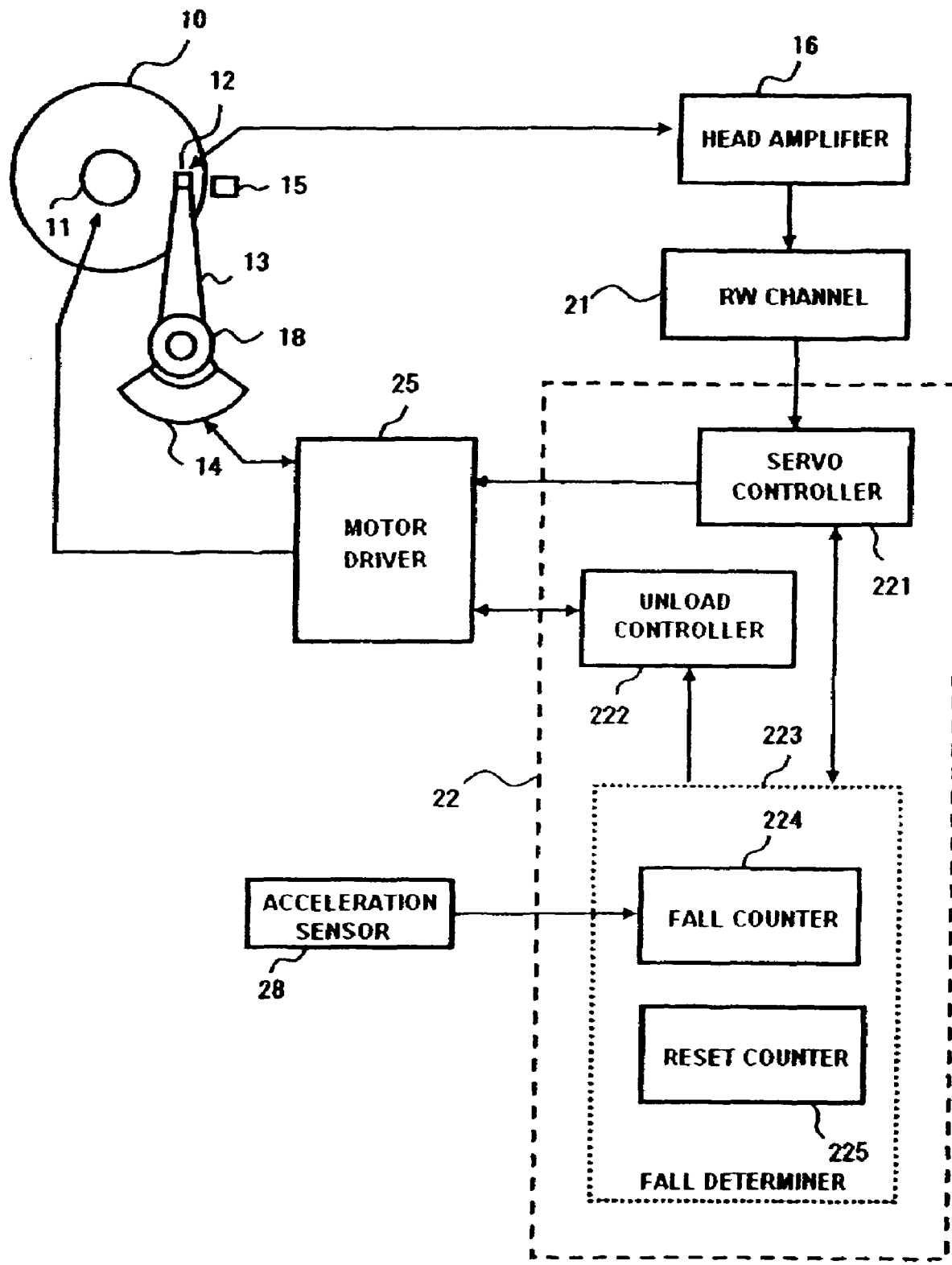
FIG. 3 is an exemplary diagram schematically showing the configuration of the relevant portion of the HDD related to the fall determination and the retract process according to one embodiment.

A procedure that the HDC/MPU 22 determines a fall based on the detection result of the acceleration sensor 28 is described with referring to FIG. 3. FIG. 3 illustrates the configuration of the main part related to the retract procedure of the HDD 1. The HDC/MPU 22 functions as a servo controller 221, an unload controller 222, a fall determiner 223, a fall counter 224, and a reset counter 225. Cooperation of the MPU operating with the firmware and the logical circuit of the HDC realizes the respective functions.

The fall determiner 223 determines a fall state of the HDD 1 based on the detection result of the acceleration sensor 28. The fall determiner 223 takes samples of the fall detection signals outputted by the acceleration sensor 28 periodically (in every 2 ms, for example). The fall determiner 223 has the fall counter 224. When the fall determiner 223 receives the fall detection signal, it decrements the fall counter. The fall determiner 223 preliminarily sets the fall counter at a predetermined initial value. When the fall counter 224 indicates zero, the fall determiner 223 determines that the HDD 1 is falling. The initial value may be set to 50 counts, for example. The fall determiner 223 may increment the fall counter 224 according to the fall detection signal outputted by the acceleration sensor 28 and determines that it is falling when the value reaches the reference value (50 counts, for example).

The fall determiner 223 further has the reset counter 225. When the fall determiner 223 does not obtain the fall detection signal at the sampling timing of the fall detection signal, it decrements the reset counter 225. The fall determiner 223 preliminarily sets the reset counter 225 at a predetermined initial value. If the fall determiner 223 obtains the fall detection signal, it resets the reset counter 225 (set at the initial value). When the reset counter 225 indicates the value of zero, the fall determiner 223 resets the fall counter 224 at the initial value. The initial value of the reset counter may be 20, for example. The counting operations of the fall counter 224 and the reset counter 225 are described later in detail.

The acceleration sensor 28 outputs the fall detection signal even in the state that it is not actually falling because the acceleration sensor 28 detects accelerations. Besides, the acceleration sensor 28 sometimes outputs the fall detection signal due to a noise. Therefore, this reset of the fall counter 224 according to the reset counter results in determining that it is falling only in the case that the acceleration sensor 28 detects falls more frequently than a predetermined frequency, which suppresses erroneous fall determinations.

It may be determined that it is falling, if the acceleration sensor 28 detects continuously the reference number of times (20 times, for example) of failings at sampling timings. However, in actual use, the fall detections by the acceleration sensor 28 do not continue but detections and non-detections repeats alternately immediately after the start of falling. Thereby, it is preferable to use the two counters as described above from the view point of prompt fall determination as well as reduction of erroneous determinations.

Next, the unload process by the unload controller 222 is explained. The unload controller 222 unloads the head slider 12 upon the determination by the fall determiner 223 that it is falling. Specifically, when the fall determiner 223 determines that it is falling according to the detection result by the acceleration sensor 28, the fall determiner 223 notifies it to the unload controller 222. The unload controller 222 which has received the notice of the determination of the fall from the fall determiner 223 instructs the motor driver 25 of a current value to be applied to the VCM 14. The motor driver 25 drives the VCM 14 according to the instruction from the unload controller 222 to move the carriage 13 toward the ramp 15.

The unload controller 222 measures the speed of the VCM 14 from the back electromotive force and unloads the head slider 12 to the retract position by speed control. The back electromotive force of the VCM 14 is proportional to the moving speed of the head slider 12 (carriage 13) so that a pivot velocity of the carriage 13 may be known. The motor driver 25 measures the back electromotive force of the VCM 14 and reports it to the unload controller 222. The unload controller 222 controls the carriage 13 to pivot at a constant velocity, while monitoring the back electromotive force.

Then, the carriage 13 crashes against a crash stop (not shown) restricting the pivot range to park at a parking position on the ramp 15. That is, the head slider 12 parks at the retract position. By the speed control like this, it is prevented that the head element portion on the head slider 12 is damaged due to an overspeed of the head during the unload and that the head slider 12 falls onto the magnetic disk 10 due to the carriage 13 bouncing off the crash stop.

The HDD 1 according to the present embodiment moves the head slider 12 to the cylinder at the side of the ramp 15 at a predetermined timing before the unload controller 222 starts the unload process, following that the fall determiner 223 determines that it is falling. This retract preparation before the unload to the ramp 15 achieves shortening the time to retract the head slider 12 to the retract position after the fall determiner 223 determines that it is falling. This reduces the possibility of crash of the head slider 12 against the magnetic disk 10.

Since the duration from the determination that it is falling to the retract is shortened by the preliminary seek process, the possibility of crash between the head and the disk caused by a fall may be reduced even if the determination time of the fall (the initial value of the fall counter 224 in this example) is not shortened. Thereby, the erroneous determinations by relaxing the conditions for the fall determination for the sake of safety may be prevented from increasing. If it is not determined that it is falling, the time for returning the head slider 12 to the initial position before the seek process and the time for a recovery process are shortened compared with the case of loading the head slider 12 from the ramp 15 to above the magnetic disk 10 so that the performance is improved. Further, since the seek operation is faster than the head moving with using the back electromotive force, moving the head to the outer periphery by the seek may shorten the process time for the retract comparing to the case of moving the head with using the back electromotive force from the beginning. Thus, in the case of preliminarily preparing the retract, increase of the duration for which the read and the write processes cannot be carried out may be suppressed.

Now, a fall response procedure including the retract preparation of the head slider 12 is described. In FIG. 3, a seek control of the head slider 12 is performed by the servo controller 221. Here, the seek control is a control to be used for positioning the head slider 12 at the time of writing and reading data to and from the magnetic disk 10. Specifically, the servo controller 221 obtains the servo data from the RW channel 21. The servo data is recorded on the magnetic disk 10, and the head slider 12 reads it out and sends it to the RW channel 21 through the head amplifier 16.

The servo controller 221 may identify the current location and the moving speed of the head slider 12 from the servo data obtained from the RW channel 21. The servo data indicates the position information of the head slider 12, in particular, a cylinder number, a sector number, and a relative position of the head slider with respect to the center of the cylinder. The servo controller 221 moves the head slider 12 to a target cylinder by the so-called speed control and positioning control. The seek speed is faster than the one in the control using the back electromotive force of the VCM 14. In this point, the seek control is a preferred method for moving the head slider in the fall response procedure. The seek control is a well known technique and detailed descriptions are omitted herein.

Figure 4:
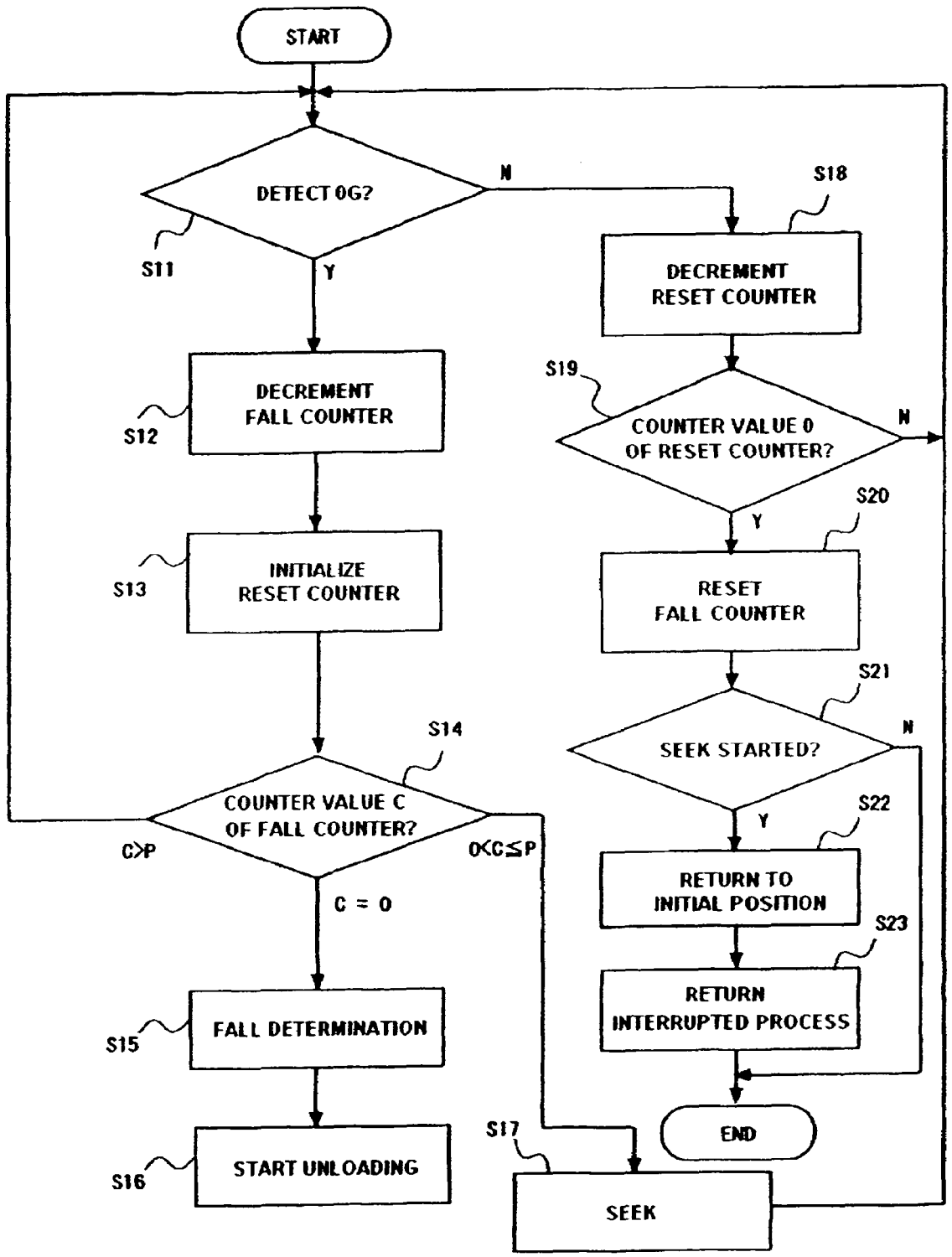
FIG. 4 is an exemplary flowchart schematically showing the steps of the fall respond procedure according to one embodiment.

Next, the fall response procedure including steps of the retract preparation, the fall determination, and the unload, referring to a flowchart of FIG. 4. When the acceleration sensor 28 detects a gravity-free state (0 G), the fall response procedure starts (START). The fall determiner 223 obtains the output signal of the acceleration sensor 28 at predetermined sampling intervals (2 ms, for example). If the acceleration sensor 28 detects the gravity-free state and the fall determiner 223 receives the fall detection signal from the acceleration sensor 28 (Y at S11), the fall determiner 223 decrements the fall counter 224 (S12). At the beginning of the procedure, the fall counter 224 has been set at a predetermined initial value (50, for example). The fall determiner 223 further sets an initial value to the reset counter 225 to initialize it (S13). Here, the initialization of the reset counter 225 may be carried out in response to the detection of 0 G so that the order of the steps of the initialization of the reset counter 225 (S13) and the decrement of the fall counter 224 (S12) may be exchanged.

If the fall determiner 223 does not obtain the fall detection signal from the acceleration sensor 28 at a sampling timing (N at S11), the fall determiner 223 decrements the reset counter 225 (S18). The reset counter 225 has been set to a predetermined initial value (20, for example) at the beginning of the process as well as the fall counter 224. If the reset counter indicates zero (Y at S19), the fall determiner 223 resets the fall counter 224 (S20) and further, if the HDC/MPU 22 has started a seek (S17) as a retract preparation (Y at S21), it returns the head slider 12 to the cylinder of the initial position (S22) and restarts the interrupted process (S23). If the seek is not carried out (N at S21), the fall retract process is ended.

When the fall determiner 223 decrements the fall counter 224 (S12) and further initializes the reset counter 225 (S13), the fall determiner 223 refers to the decremented value of the fall counter 224 (S14) and carries out a process according to the counter value C. Specifically, if the counter value C of the fall counter 224 is larger than P (C>P at S14), the process returns to the 0 G detection determination step (S11). Here, the initialization of the reset counter 225 may be carried out in response to the detection of 0 G so that the fall determiner 223 may initialize the reset counter 225 (S13) after it determines that the counter value C of the fall counter 224 is larger than P.

When the fall determiner 223 repeats the decrements (S12) and the counter value C of the fall counter 224 decreases to P ($0<C \leq P$ at S14), the fall determiner 223 instructs the servo controller 221 to start a seek. The servo controller 221 starts the seeking of the head slider 12 in response to the instruction from the fall determiner 223 (S17). The specific process at S17 is as follows. The fall determiner 223 instructs the servo controller 221 to start a seek in the case of C=P at S14. When the fall counter 224 indicates a value which is not more than P except for 0, the fall determiner 223 determines whether the seek has already been started or not. If the seek has not been started yet, the fall determiner 223 instructs the servo controller 221 to start the seek, and if the seek has already been started, it does not repeat the instruction about the seek.

The servo controller 221 moves the head slider 12 to a target cylinder around the outer periphery of the magnetic disk near the ramp 15. Specifically, the cylinder at the outermost peripheral edge of the data region may be the target cylinder for the retract preparation. Or, any cylinder where the servo data is recorded in a non-data region may be set as the target cylinder. The non-data region is at outer peripheral side than the data region and user data are not recorded in it. If the servo data is recorded, the head position may be detected so that the seek and the following may be controlled.

Selecting the cylinder (radial position) like the above as the target position may shorten the time from the determination of the fall to the completion of the unload so much. The target cylinder is not needed to correspond to the data track.

When the fall determiner 223 repeats the decrements (S12) and the counter value C of the fall counter 224 decreases to 0 (C=0 at S14), the fall determiner 223 determines that the HDD 1 is in a falling state (S15) and instructs the unload controller 222 to unload the head slider 12. The unload controller 222 starts the unload to move the carriage 13 onto the ramp 15 (S16). Thus, the head slider 12 is retracted to the retract position apart from above the magnetic disk.

Now, the process for reloading the head slider 12 which has been unloaded in accordance with the determination that the HDD 1 is falling is described. The HDC/MPU 22 determines whether or not the falling state is cleared, i.e., whether or not the HDD 1 gets in a state that it is not falling, by using the output signal of the acceleration sensor 28. This determination may be started for example as a result of that the magnitude of any one of the three directional accelerations detected by the acceleration sensor 28 becomes larger than the fall detection threshold (0.4 G for example).

The HDC/MPU 22 which detected the falling state cleared determines whether or not a shock due to the fall was detected within a predetermined time after the falling state is cleared. If a shock is not detected within the predetermined time after the falling state is cleared, the HDC/MPU 22 loads the head slider 12 promptly assuming the determination that it is falling as an error. On the other hand, if the shock sensor 26 detects the shock within the predetermined time after the falling state is cleared, the HDC/MPU 22, assuming the shock due to the fall, further waits for a predetermined protection time after the falling state and the shock detections were cleared, and then, loads the head slider 12.

As described above, moving the head slider 12 preliminarily to the cylinder near the retract position between the timing of the detection of gravity-free state and the timing of the fall determination may shorten the time from the determination of the fall to the completion of the retract procedure and prevent a head-disk contact due to the fall impact more accurately. The time taken for the unload depends on the position of the head, so that the above described retract procedure is especially effective when the head slider 12 is in the access process (read/write process) to the magnetic disk 10 at the inner peripheral side of the cylinder.

Hereinbelow, some variations of the above-described fall response procedure are described. In a preferred example, the HDD 1 changes the timing to start the seek for the retract preparation according to the position of the head. In order to read/write data as much as possible, it is preferable that the timing to start the seek is delayed as possible. On the other hand, it is important that the seek is completed until the fall determiner 223 determines that it is falling. The time from the start of the seek to the completion of the seek changes in accordance with the initial position of the head slider 12. Accordingly, changing the start time of the seek according to the head position attains less interference in the read/write process as well as an accurate retract preparation.

Specifically, the fall determiner 223 determines the counter value P of the fall counter 224, which is the reference value of the start of the seek, as a function of the head initial position (cylinder) before the start of the seek. The function is preliminarily set in the HDD 1. The fall determiner 223 may obtain the information about the head initial position from the servo controller 221. Since more time is required to reach the target as the initial position is at the inner peripheral side, the seek start counter value P is set larger as the initial position is at the inner peripheral side. That is, the seek is started at an earlier timing.

Or, the region of the magnetic disk 10 is divided into a plurality of regions in the radial direction and the same seek start counter values Ps are assigned to the cylinders in the same divided region. The seek start counter values Ps vary from one region to another, and the values increase from the outer to the inner region. The fall determiner 223 identifies the region including the head initial position obtained from the servo controller 221 and sets the value corresponding to the region as the initial value of the fall counter 224.

According to another preferred embodiment, the HDD 1 has a function to change the initial value and the seek start counter value P of the fall counter 224. Specifically, for example, the fall determiner 223 changes the initial value and the seek start counter value P of the fall counter 224 in accordance with a command from an external host. In digital video recorders and digital cameras for example, users may change the initial value and the seek start counter value P of the fall counter 224 according to their use conditions. For example, it is preferable that three values are prepared as the initial values and the seek start counter values Ps respectively for the users to select each one of these. Here, the initial value of the reset counter 225 is preferably changed according to the change of the initial value of the fall counter 224.

The sensitivity of the fall determination changes with the initial value of the fall counter 224. If the initial value is larger, erroneous determinations of falls decrease and the performance improves. On the other hand, if the initial value is smaller, the safety is improved. Advancing the seek start timing by setting the seek start counter value P larger improves the safety. On the other hand, delaying the seek start timing by setting the seek start counter value P smaller improves the performance.

The fall determiner 223 may set the initial value of the fall counter 224 according to a command from the external host and decide the seek start counter value P according to the set initial value of the fall counter 224. For example, a user may select one of the three, high, middle, and low, sensitivities for the fall determination. The higher the sensitivity for the fall determination is, the smaller the initial value of the fall counter 224 is so that the determination that it is falling is made within a short detecting period of the gravity-free state. The fall determiner 223 preliminarily has the seek start counter values Ps corresponding to the respective sensitivities and determines the seek start timing according to the seek start counter value P corresponding to the selected sensitivity.

It may be preferable to set the seek start counter value P to increase with the increase of the sensitivity for the fall determination (decrease of the initial value of the fall counter 224), that is, to preliminarily set the seek start timing earlier. Thereby, if the user selects a high sensitivity for the fall determination in favor of the safety, this is the setting to have a higher priority in the safety than in the seek operation as the retract preparation operation. To the contrary, it may preliminarily set the seek start counter value P to decrease with the increase of the sensitivity of the fall determination.

In addition to the above-described way to change the initial value of the fall counter 224, it is possible to change the value of the fall counter 224 during the decrement, to change the amount of the decrement of the fall counter 224 according to the designs.

Figure 5:
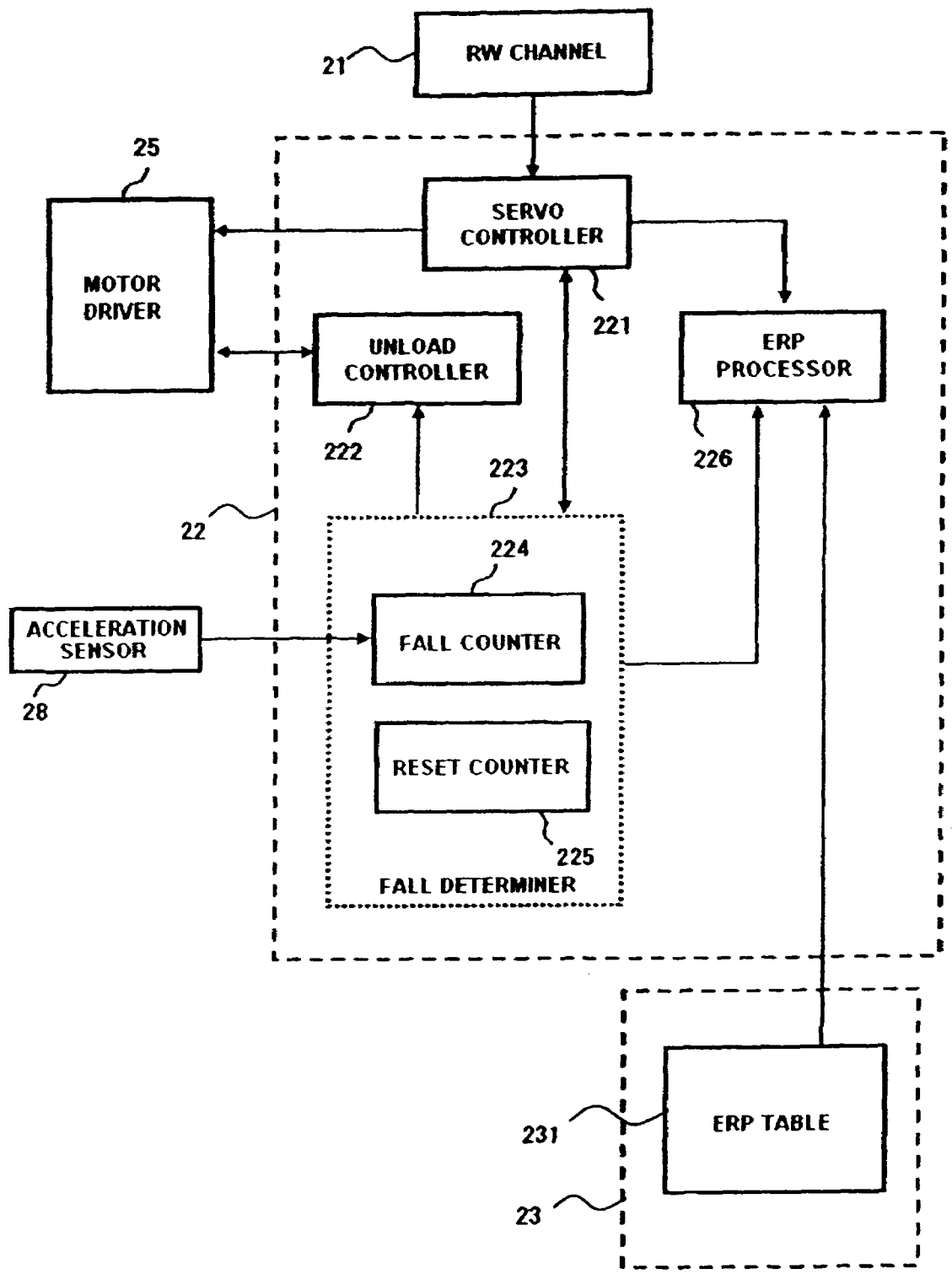
FIG. 5 is an exemplary block diagram schematically showing the configuration of the relevant portion of the HDD responding to the occurrence of the seek error in the fall respond procedure according to one embodiment.

Next, a process in the case that a seek error occurs in the seek as the retract preparation process is described with referring to a block diagram of FIG. 5. In the seek control by the servo controller 221, when servo data cannot be read correctly, a seek error occurs. When the seek error occurs, an error recovery procedure (ERP) processor 226 carries out an error recovery procedure according to an ERP table 231. The ERP table 231 contains a plurality of ERP steps and the ERP processor 226 carries out the steps sequentially from a high-order step until the error is solved.

When the seek error occurs, the servo controller 221 notifies the ERP processor 226 that the seek error has occurred and instructs it to perform the error recovery procedure. The ERP processor 226 performs the processes according to the ERP table 231. During the error recovery procedure, the fall determiner 223 continues the process of the fall determination. That is, it decrements the fall counter 224 according to the output of the acceleration sensor 28. If the fall determiner 223 determines that it is falling during the error recovery procedure, the fall determiner 223 notifies it to the ERP processor 226 and instructs it to cease the error recovery procedure. The fall determiner 223 instructs the unload controller 222 to unload the head slider 12 to the retract position.

Thus, when the fall determiner 223 determines that it is falling, the recovery procedure of the seek error is interrupted and the unload process is carried out, even if the error recovery procedure of the seek error is in progress. This prevents the delay of the retract to the retract position due to the error recovery procedure and unrecoverable damages to the head slider 12 and the magnetic disk 10 due to the shock by the fall.

When the seek error occurs during the seek of the retract preparation, the HDD 1 may start the unloading without performing the error recovery procedure for the seek error. That is, the HDD 1 unloads the head slider 12 to the retract position without waiting for the determination result of the fall determiner 223. Specifically, when the seek error occurs, the servo controller 221 notifies the fall determiner 223 that the seek error has occurred and further instructs the unload controller 222 to unload the head slider 12. The unload controller 222 unloads the head slider 12 to the retract position without waiting for the final determination of the fall determiner 223.

The two procedures to respond to the occurrence of the seek error have been described. When the seek error occurs, an unload operation to the retract position is to be carried out at the timing of the determination or prior to the determination so that the fall determiner 223 does not pass the timing for the final fall determination. This prevents the retraction to the retract position from being delayed due to the error recovery procedure and the head slider 12 and the magnetic disk 10 from suffering unrecoverable damages due to the shock by the fall.

As set forth above, the present invention is described by way of the particular embodiments but is not limited to the above embodiments. A person skilled in the art may easily modify, add, and convert each element in the above embodiments within the scope of the present invention. For example, the acceleration sensor 28 may be located outside of the HDD 1, for example, inside of a housing of an electronic device on which the HDD 1 is mounted. In such a case, it is considered that the disk drive device includes other circuit than the HDD 1 in the electronic device.

Also, the fall respond procedure according to embodiments of the present invention may be applied to the HDD with contact start and stop (CSS) scheme. In the CSS scheme, the retract position is provided at the innermost peripheral region of the magnetic disk. Even if either the CSS scheme or the load/unload scheme is adopted, the retract position of the head slider exists outside of the data storage region. In the point of preventing the damage by the shock, the load/unload scheme is superior.

As described above, it is preferable that the unload is carried out with a constant speed control by monitoring the back electromotive force of the VCM 14. However, unlike this, it may be constructed to carry out the unload with supplying a predetermined value of current to the VCM 14 without the constant speed control. Further, the seek as the retract preparation is preferably conducted anytime, but the preliminary retract may not be performed in accordance with the initial position of the head and may be omitted. For example, the HDC/MPU 22 skips the seek process and performs the unload process after the determination of the fall if the head slider 12 is accessing the magnetic disk 10 at an outer peripheral region than the predetermined cylinder. The target position of the seek is typically the same anytime, but it may change in accordance with the conditions.

What is claimed is:

1. A disk drive comprising:
a head for accessing a data region of a disk;
a detector;
a moving mechanism for supporting and moving the head; and
a controller for controlling the moving mechanism to move the head to a retract position outside of the data region in response to a detection result of the detector for detecting that an acceleration of the detector reaches a first reference, and further for controlling the moving mechanism to carry out a seek operation of the head toward a radial position which is closer to the retract position than a current position of the head, in response to another detection result of the detector reaching a second reference prior to reaching the first reference.

2. The disk drive according to claim 1, wherein the controller changes the second reference according to the position of the head at the time of starting the seek operation.

3. The disk drive according to claim 1, wherein the controller changes the first reference and the second reference according to a command from an external controller.

4. The disk drive according to claim 1, wherein the controller changes the first reference according to a command from an external controller, and further changes the second reference according to the first reference.

5. The disk drive according to claim 1, wherein the controller starts to move the head to the retract position before the detection result of the detector exceeds the first reference when an error occurs in the seek operation.

6. The disk drive according to claim 5, wherein the controller ceases an error recovery procedure and starts to move the head to the retract position when the detection result of the detector reaches the first reference on the way of the error recovery procedure for the error.

7. The disk drive according to claim 5, wherein the controller starts to move the head to the retract position in response to the occurrence of the error.

8. The disk drive according to claim 1, wherein the controller returns to a process before the seek operation without moving the head to the retract position, if the detection result does not reach the first reference.

9. A method for retracting a head in a disk drive comprising;
providing a disk drive with a detector;
obtaining a detection result of the detector for detecting an acceleration of the detector;
determining that the disk drive is falling in response to the detection result reaching a first reference;
moving the head to a retract position outside a data region of a disk in response to the determination that the disk drive is falling; and
conducting a seek of the head toward a radial position which is closer to the retract position than a current position of the head, in response to the detection result of the detector reaching a second reference prior to reaching the first reference.

10. The method according to claim 9, wherein the moving the head to the retract position is not performed, and returning to a process before the seek, if the detection result does not reach the first reference.

11. The method according to claim 9, wherein the moving the head to the retract position is started before the detection result exceeds the first reference, if an error occurs in the seek.

12. The method according to claim 11, wherein an error recovery procedure for the error is ceased, and the moving the head to the retract position is started, if the detection result of the detector reaches the first reference on the way of the error recovery procedure for the error.

13. The method according to claim 11, wherein the moving the head to the retract position is started in response to the occurrence of the error.

* * * * *